(12) United States Patent
Batzer et al.

(10) Patent No.: US 7,430,263 B1
(45) Date of Patent: Sep. 30, 2008

(54) SYSTEM AND METHOD FOR TIMING CORRECTION FOR FAST PN ACQUISITION

(76) Inventors: Patricia F. Batzer, 691 Raygene Way, North Salt Lake City, UT (US) 84054; Michael L. Wilson, 4635 S. 2930 W., #138, West Valley City, UT (US) 84119; LaMar K. Timothy, 663 Oak La., Kaysville, UT (US) 84036

( * ) Notice: Subject to any disclaimer, the term of this patent is extended or adjusted under 35 U.S.C. 154(b) by 669 days.

(21) Appl. No.: 10/840,521

(22) Filed: May 6, 2004

(51) Int. Cl.
*H04L 7/00* (2006.01)
(52) U.S. Cl. ........................ 375/367; 370/515
(58) Field of Classification Search ............... 375/367; 370/515
See application file for complete search history.

(56) References Cited

U.S. PATENT DOCUMENTS

| | | | | |
|---|---|---|---|---|
| 5,528,624 A * | 6/1996 | Kaku et al. | ................. | 375/148 |
| 6,104,237 A * | 8/2000 | Mabuchi | ..................... | 329/307 |
| 6,133,873 A * | 10/2000 | Krasner | ................. | 342/357.12 |
| 6,151,355 A | 11/2000 | Vallee et al. | | |
| 6,192,070 B1 | 2/2001 | Poon et al. | | |
| 6,445,685 B1 * | 9/2002 | Carrozza et al. | ............ | 370/316 |
| 6,507,827 B1 | 1/2003 | Benson, Jr. | | |
| 2003/0235238 A1 * | 12/2003 | Schelm et al. | ............. | 375/148 |

OTHER PUBLICATIONS

"Adaptive Signal Processing" Bernard Widrow & Samuel D. Stearns 1985 Prentice Hall, Inc., Englewood Cliffs, New Jersey 070632 Chapter 2.*

* cited by examiner

*Primary Examiner*—Shuwang Liu
*Assistant Examiner*—Michael R Neff (57) ABSTRACT

A timing correction system for fast PN acquisition is provided. The system includes a signal sampler for testing any incoming signal and a real-time clocker coupled to the signal sampler. A parallel correlator is coupled to the real-time clocker for searching for a PN sequence and a burst detector is coupled to the parallel correlator. A chip timing corrector is coupled to the burst detector and a processor is coupled to the chip timing corrector for determining signal timing.

12 Claims, 6 Drawing Sheets

SYSTEM AND METHOD FOR TIMING CORRECTION FOR FAST PN ACQUISITION

BACKGROUND OF THE INVENTION

1. Field of the Invention

This invention relates generally to communication systems using Pseudo-Noise (PN) coding techniques, and pertains more specifically to methods and systems for timing correction for fast PN acquisition.

2. Prior Art

Numerous multiple access communication systems have been developed for transferring information among a large number of system users. Techniques employed by such multiple access communication systems include time division multiple access (TDMA), frequency division multiple access (FDMA), and AM modulation schemes, such as amplitude companded single sideband (ACSSB), the basics of which are well known in the art.

In Spread Spectrum (SS) or TDMA-SS transmission systems, a succession of short-duration bursts emanating from a number of different stations are presented to a demodulator. Each burst may contain data frames from one or more data channels. Each data frame generally contains synchronization or sync word and a data payload area.

Minimizing PN acquisition time for burst signals is necessary for fast PN acquisition and generally requires estimating chip time alignment. However, until a burst is detected, there is no knowledge of the signal timing.

Current implementations also require iterative estimations, as in the case with an early-late gate in a feedback loop. Current implementations also require that the PN timing already be within a PN chip range as in the case with an early-late gate method. This approach does not allow timing errors to be determined and compensated as soon as a parallel correlator detects the burst signal such that the next received PN chip can be correctly sampled at the optimum position and demodulated by the receiver. This "pull-in" time restricts receiving the next PN chip sampled at the optimum timing. Current implementations also require calculations to be performed over a training sequence or over the initial portion of the burst, again requiring extra time as well as using a portion of the burst signal payload for timing purposes rather than data transfer.

Therefore, it is desirable for a system and method for fast PN timing estimate not requiring iterative estimations, as is the case with an early-late gate in a feedback loop. It is also desirable that the PN timing estimate is not required to be within a PN chip range, as is the case with the early-late gate method. It is further desirable for a PN timing implementation to allow asynchronous chip timing, which may be used for a continuous-time function that may contain discontinuities, and may not have a derivative at every point within its domain.

SUMMARY OF THE INVENTION

The foregoing and other problems are overcome, and other advantages are realized, in accordance with the teachings presented herein.

In accordance with one embodiment of the present invention, a timing correction system for fast PN acquisition is provided. The system includes a signal sampler for testing an incoming signal and a real-time clocker coupled to the signal sampler. A parallel correlator is coupled to the real-time clocker for searching for a PN sequence and a burst detector is coupled to the parallel correlator. A chip timing corrector is coupled to the burst detector and a processor is coupled to the chip timing corrector for determining signal timing.

The invention is also directed towards a method for timing correction for fast PN acquisition. The method includes measuring a first set of measured points. The method also includes determining a time shifted set of ideal points, and comparing the first set of measured points against the time shifted set of ideal points. The method also includes determining an optimum time-shift variable resulting from the comparison of the first set of measured points with the time shifted set of ideal points.

In accordance with another embodiment of the present invention a program storage device readable by a machine, tangibly embodying a program of instructions executable by the machine to perform method steps for timing correction for fast PN acquisition is provided. The method includes measuring a first set of measured points and determining a time shifted set of ideal points; and comparing the first set of measured points against the time shifted set of ideal points. The method also includes determining an optimum time-shift variable resulting from the comparison of the first set of measured points against the time shifted set of ideal points.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENT

Figure 5:
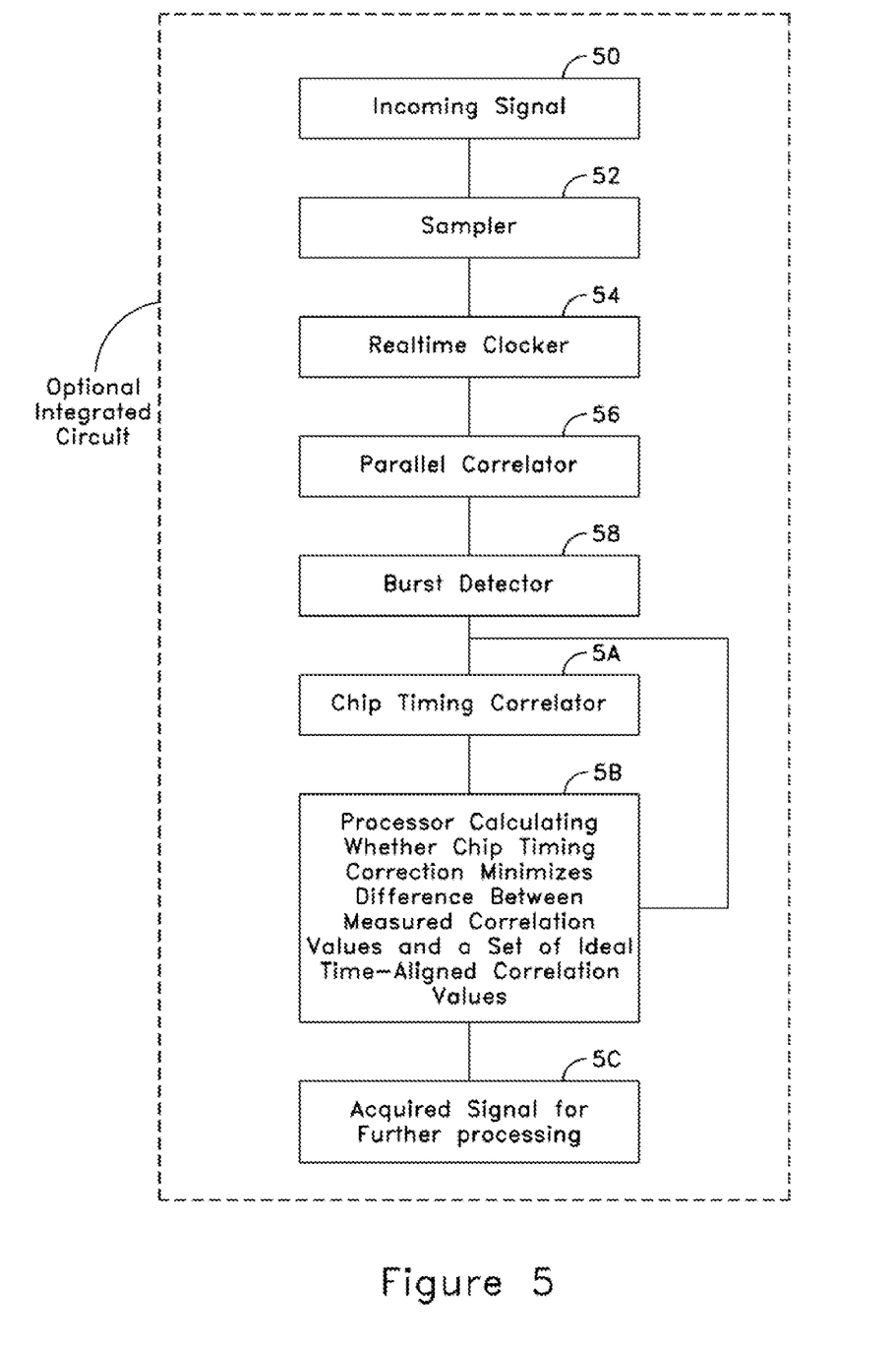
FIG. 5 is a block diagram of a timing correction device for fast PN acquisition incorporating features of the present invention.
Figure 6:
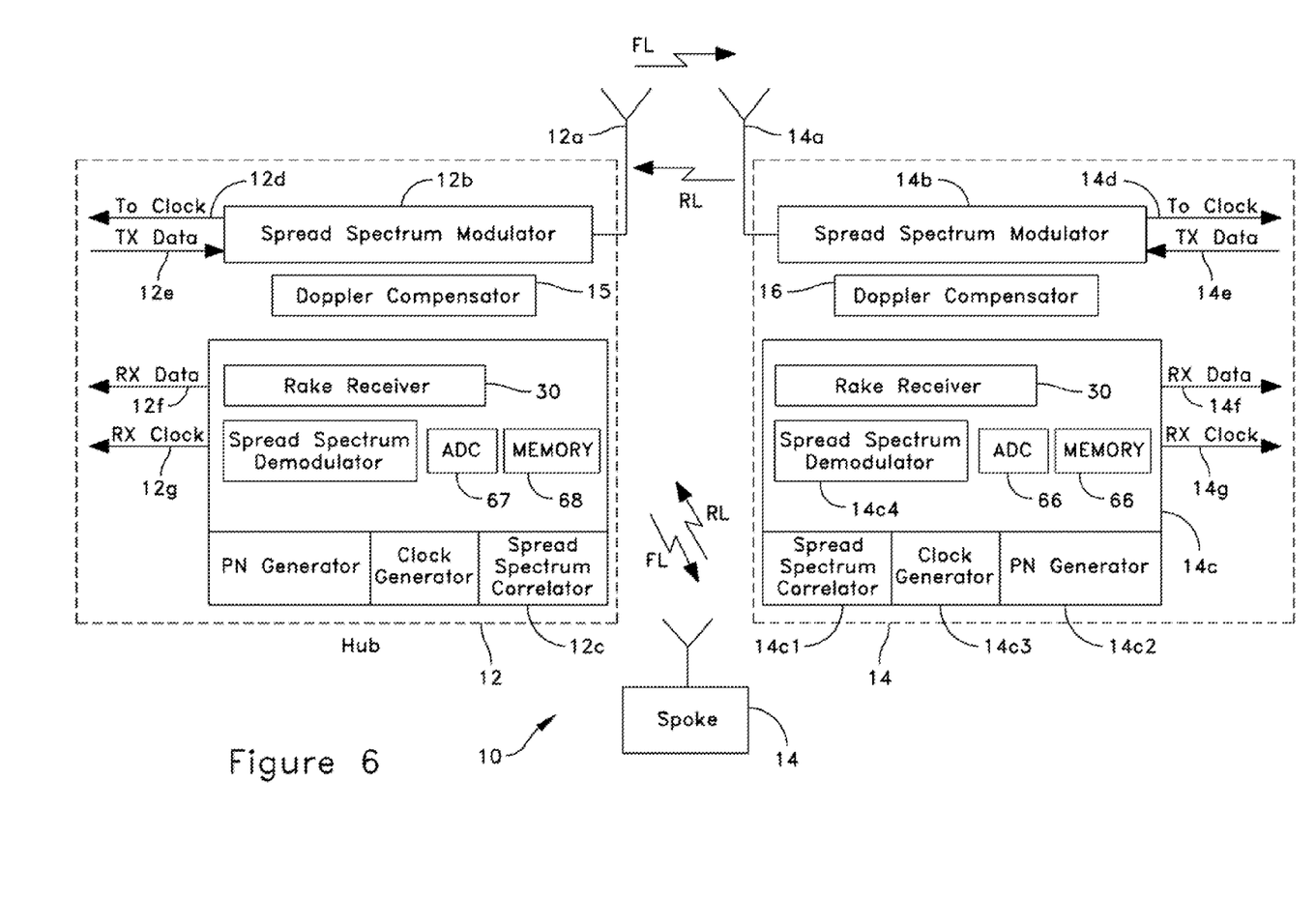
FIG. 6 is a block diagram of a hybrid TDMA-SS communication system incorporating features of the present invention shown in FIG. 5.

Referring to FIG. 6, there is shown a block diagram of a hybrid TDMA-SS communication system incorporating features of the present invention shown in FIG. 5. FIG. 6 shows a full-duplex system 10 that is suitable for practicing this invention. Specifically, the system 10 employs direct sequence spread spectrum based techniques over an air link to provide data transfer between HUB 12 and SPOKE 14. The forward link (FL) from HUB 12 to SPOKE 14 contains a spread spectrum waveform that is constructed in the manner described herein, with the PN code being composed of even-length and/or maximal length codes. In a similar manner, the return link (RL) from SPOKE 14 to HUB 12 contains a spread spectrum waveform that is similar, or identical, to that of the FL.

Still referring to FIG. 6, HUB 12 includes a Spread Spectrum Modulator (SSM) 12*b*; the SSM 12*b* generates a desired spread spectrum waveform at a desired RF frequency. The SSM 12*b* also provides a Tx clock 12*d* that is used to clock the Tx Data 12*e* into the SSM 12*b*. The SSM 12*b* then combines the Tx data 12*e* with a spread spectrum PN code to produce the desired spread spectrum waveform. HUB 12 also includes an antenna 12*a*, which may transmit at any suitable RF frequency.

The signal generated by HUB 12 and transmitted by antenna 12*a* via the FL is received by SPOKE 14 via antenna 14*a*. Spoke 14 includes a spread spectrum correlator 14*c*1, PN generator 14*c*2, clock generator 14*c*3, and spread spectrum demodulator (SSD) 14*c*4. The received signal is then demodulated by SSD 14*c*4. Once the signal is acquired and the SPOKE 14 is tracking the received signal, the Rx Clock 14*g* and Rx Data 14*f* are output to the intended receiver circuitry.

Similarly, SPOKE 14 generates a Tx Clock 14*d* and Tx Data 14*e* using the Spread Spectrum Modulator 14*b* in a similar fashion described earlier for HUB. Likewise, HUB 12 may receive the RL signal via antenna 12*a*, and demodulate and track the signal as described earlier with receiver 12*c* to provide Rx Data 12*f* and Rx Clock 12*g* to the intended user.

Still referring to FIG. 6, during an interrupt time slot(s) (not shown), a Spoke 14 has a message to transmit, the Spoke 14 selects a transmitted PN code phase to correspond to the pre-assigned priority. Referring also to FIG. 5, and as will be described herein, a Chip Timing Corrector 5A and a Processor 5B determine whether chip-timing correction minimizes the difference between measured correlation value(s) and ideal time-aligned correlation value(s). The minimized difference may then be used to control the frequency and phase of the Spoke 14 transmitted PN code to arrive at the Hub 12 within suitable chip accuracy, e.g., ±1 chip. In addition, it will be appreciated that the invention my be implemented in configurations other than the HUB 12 and SPOKE 14 example of FIG. 1. For example, the invention may be implemented for point to point communications. It will also be appreciated that the invention may be implemented for either PN chip or symbol acquisition.

Figure 1:
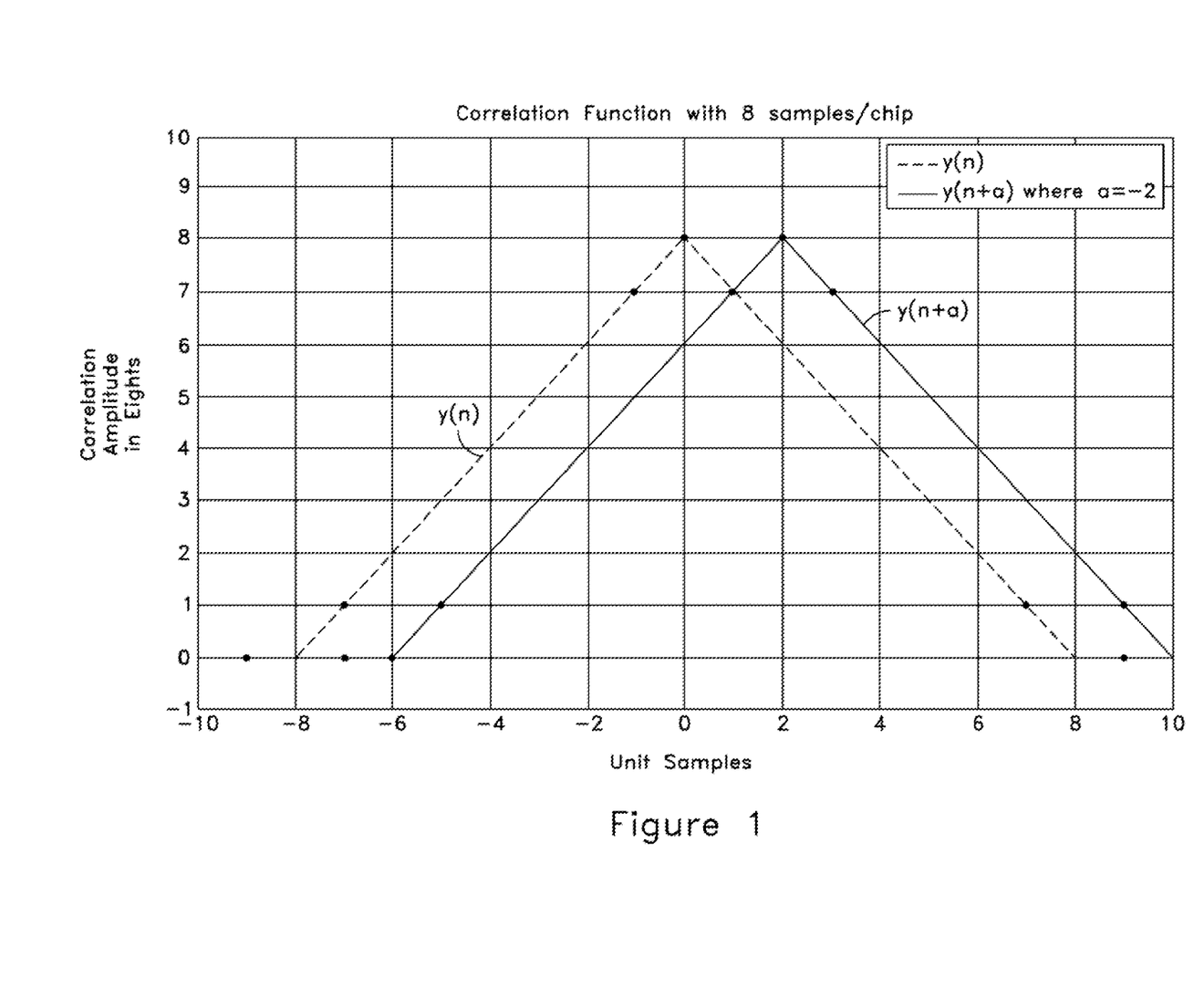
FIG. 1 is a plot of a discrete time function used in accordance with features of the present invention shown in FIG. 6.

A feature of the invention estimates a chip timing correction value for PN acquisition as part of timing recovery. Referring to FIG. 1, a timing estimate determined from the minimum squared error sum between the theoretical discrete points of the correlation function, and the measured points are desired for a reasonable fit to a correlation function. FIG. 1 is an example that assumes a square pulse shape for the PN chips, which yields a triangular correlation function. It will be appreciated that any suitable pulse shape for the chip may be used, thereby yielding any suitable correlation function. In the example shown in FIG. 1, the triangular correlation function is for 8 samples per chip. However, it will be appreciated that any suitable number of samples per chip may be used.

Continuing the 8 samples per chip example, in this case a triangular correlation function for 8 samples per chip may be expressed as:

$$y(n) = \frac{-|n|+8}{8} \text{ for } |n| < 8$$

$$= 0 \text{ otherwise}$$

Equation 1 and shifting the function by "a" gives $$y(n+a) = \frac{-|n+a|+8}{8} \text{ for } |n+a| < 8$$

$$= 0 \text{ otherwise}$$

Equation 2

In Equation 1, the triangular discrete correlation function y(n) for 8 samples per chip is expressed as minus the absolute value of unit sample plus 8, all divided by 8, for absolute value of the number of unit samples less than 8. In equation 2 the correlation function y(n+a) for 8 samples per chip is expressed when shifting the function by "a" samples, where "a" can be positive or negative.

It will be appreciated that the invention advantageously compares a set of measured points against a set of ideal points for each time shift in the range, and selects a time-shift variable that yields the minimum squared error between the sets. It will be appreciated that prior art methods, such as the Method of Least Squares, explicitly determine the coefficients of a function yielding the minimum squared error by taking the derivative of the sum of the squared error with respect to the function's coefficient and setting it equal to zero. However, an explicit solution for variable "a" was not obtainable for the correlation function containing |n+a|, only an inequality. Prior art is therefore not advantageous due to only obtaining inequality. It is therefore advantageous to have a search routine that determines the squared difference between the set of measured samples and the set of ideal samples for each "a" in range. It will be appreciated that the invention advantageously determines the shift value "a" such that the total difference (error) between the time-aligned ideal correlation samples and the measured correlation samples is optimally minimal.

Figure 3:
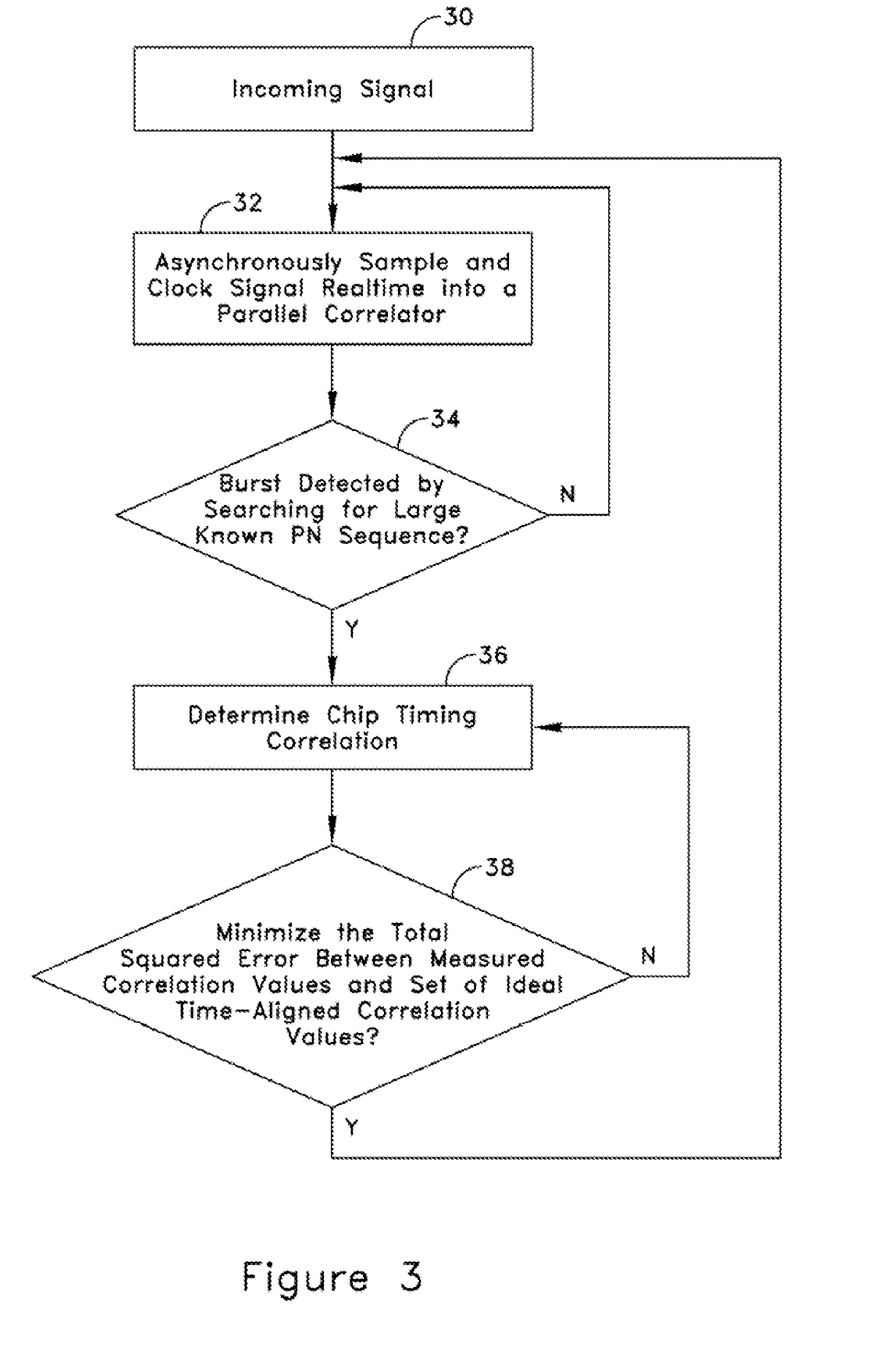
FIG. 3 is a method flow chart showing steps for one method of implementing timing correction features of the present invention for fast PN acquisition.

Referring also to FIG. 3 there is shown a method flow chart showing steps for one method of implementing the timing correction for fast PN acquisition. The first step 30 receives an incoming signal. The next step 32 asynchronously samples and clocks the signal real-time into a parallel correlator. Step 34 determines whether any burst is detected by searching for large known PN sequences. If the result of step 34 is negative, then the process starts over at step 32; if the result of step 34 is positive then the chip timing correction, step 36, is determined. Step 38 minimizes the total squared error between measured correlation values and set of ideal time-aligned correlation values. If the result of step 38 is negative then the process returns to step 36; if the result of step 38 is positive then the entire process starts over at step 32.

Figure 4:
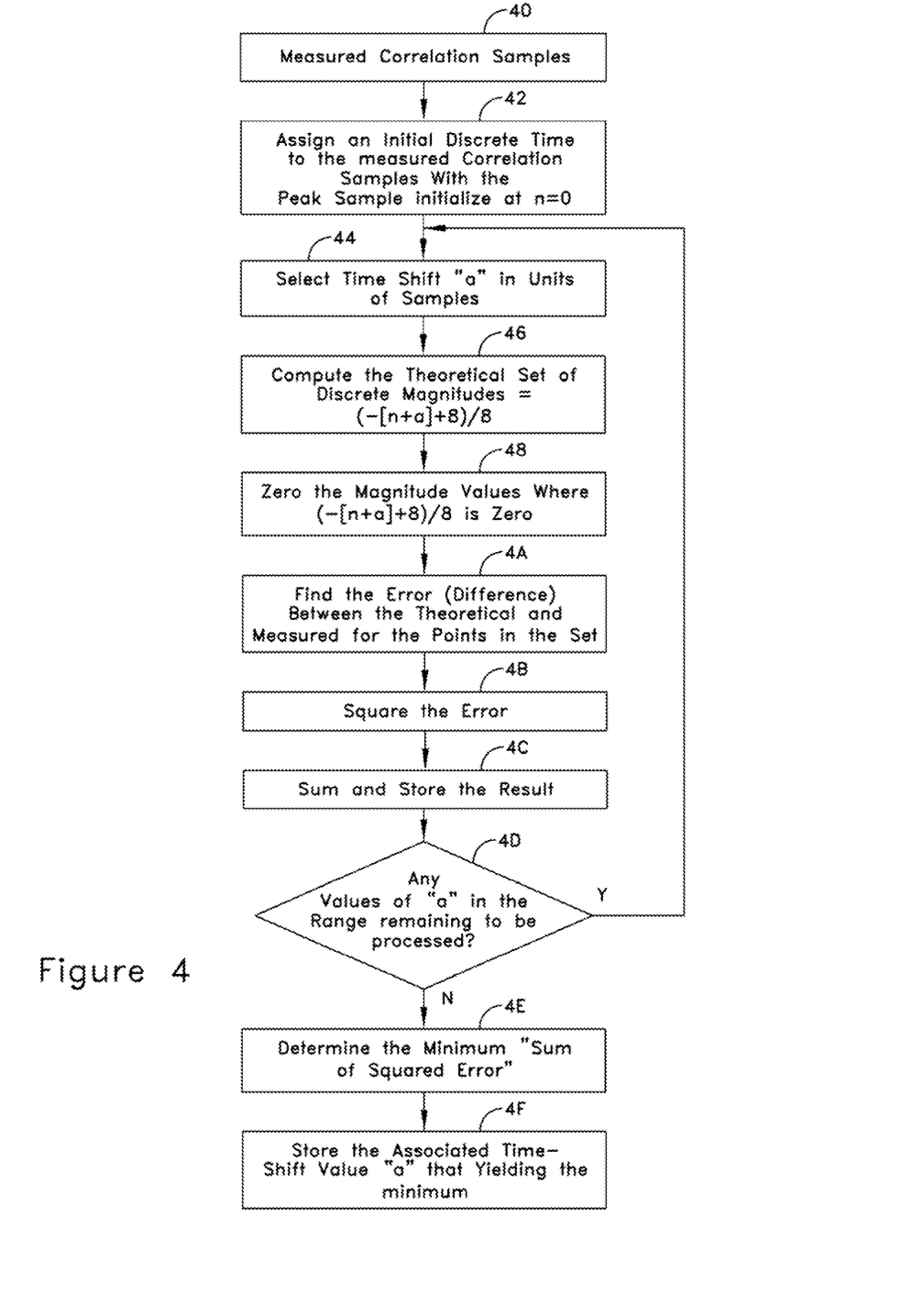
FIG. 4 is a method flow chart showing steps for one method of implementing squared error features of the present invention shown in FIG. 3.

Referring also to FIG. 4 there is shown a method flow chart showing steps for one method of implementing squared error features of the present invention shown in FIG. 3. The first step 40 measures correlation samples. The next step 42 assigns an initial discrete time to the measured correlation samples. The peak sample in step 42, initialized at n equals 0. Step 44 selects time shift "a" in units of samples. Step 46 computes the theoretical set of discrete magnitudes, which equal minus the absolute value of n plus a, that sum plus the samples per chip, e.g. 8, then divided by 8. Step 48 then zeroes the magnitude values where the function is zero. Next, step 4A determines the error or difference between the theoretical and measured for the points in the set. Step 4B squares the error and step 4C sums and stores the result in memory such as memory FIG. 1, item 66. Step 4D determines whether any values of "a" in the range are remaining to be processed. If the result of step 4D is positive then the process starts over at step 42; if the result of step 4D is negative then the minimum sum of squared error is determined, step 4E. Next, step 4F stores the associated time-shift value "a" that yielded the minimum. The following is one example of an embodiment of this method implemented in code:

```
Input=y_measured=[2.4475 6.2332 5.9515 2.4502]
n=[-4 0 4 8]
a=+2:-1:-2;
% Resolution for "a" is one sample; may go to 0.5 samples
for k=1:length(a)
y_th(k,:)=(-abs(n+a(k))+8);
%Determine theoretical magnitude at the assumed "n" +a
```

```
window_index=find(abs(n+a(k)) >8);
% Zero function
y_th(k,window_index)=0;
error(k,:)=y_th(k,:)-y_measured(1,:);
%Determine error between theoretical & measured
sum_sqr_err(k)=sum(error(k,:).^2);
%Square differences so error doesn't cancel,
%then sum
end
[v,i]=min(sum_sqr_err);
%Locate minimum of sum of squared error
timing_est=a(i)
%Grab the "a" associated with minimum
```

Note: The variables to store for processing are "sum_sqr_err" and "a". Other variables may be stored for testing and plotting.

Figure 2:
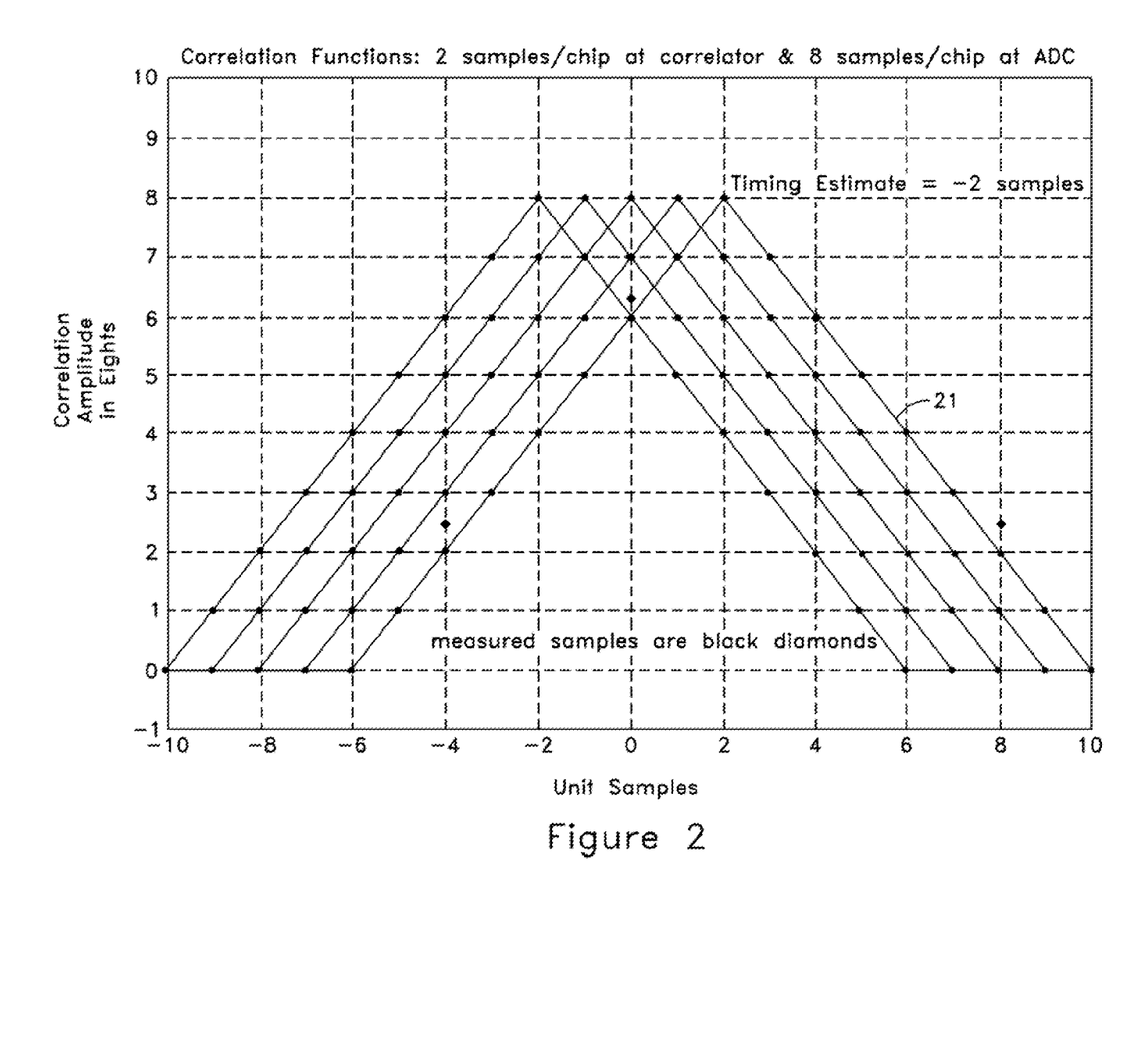
FIG. 2 is a plot of measured samples, and the theoretical samples shifted through the range of a time shift variable ("a") in accordance with features of the present invention.

The above example may be utilized both for noise-free signals and samples with noise. For example, in a test case having noise of 6 dB and chip offset of 0.35 (or ⅜) the measured set of y_measured points=[2.4475 6.2332 5.9515 2.4502]. FIG. 2 depicts the measured samples, and the theoretical samples shifted through the range "a". In this example the timing estimate was determined to be −2, which is −⅜, the correct time estimate. In FIG. 2 the measured points are diamonds and the optimum correlation function triangle is the right-most triangle 21.

Referring also to FIG. 5 there is shown a block diagram of timing correction for fast PN acquisition system 5 incorporating features of the present invention. The first block 50 represents the incoming signal. The incoming signal 50 is sampled 52 and clocked real-time 54. The signal passes into a parallel correlator 54 which searches for a large known PN sequence. The signal passes to a burst detector 58. The system 5 uses a Chip Timing Corrector 5A to adjust the PN timing alignment. The system 5 then uses a processor 5B to compare PN correlation values against a set of ideal time-aligned correlation values and determine when the timing correction minimizes the total squared error between the measured correlation values and the set of time-aligned correlation values. Once the timing correction that minimizes the total squared error between the measured correlation values and the set of time-aligned correlation values is determined by processor 5B then the signal is available for further processing 5C.

In addition, in alternate embodiments features of the present invention may be implemented in a programmable device such as an integrated circuit (IC). It will be further appreciated that the IC may be a field programmable gate array (FPGA), an application specific IC (ASIC), or a function of Modulator, Demodulator, Controller (MDC) firmware. The operation of the ICs or firmware may be defined by a suitable programming language such as a Very High Speed Integrated Circuit (VHSIC) Hardware Description (VHDL) Language file. Accordingly, the present invention is intended to embrace all such alternatives, modifications, and variances that fall within the scope of the appended claims.

What is claimed is:

1. A method for timing correction for fast PN acquisition, the method comprising:
   measuring a first set of measured points, wherein the first set of measured points correspond to a first set of measured correlation samples;
   determining a set of ideal points;
   comparing the first set of measured points against the set of ideal points, wherein comparing the first set of measured points against the set of ideal points further comprises:
   measuring a plurality of correlation samples;
   assigning a first discrete time to the plurality of measured correlation samples;
   assigning a time shift in units of samples;
   determining a theoretical set of discrete magnitudes;
   determining a correlation function;
   determining where the correlation function equals zero;
   zeroing the theoretical set of discrete magnitudes where the correlation function equation equals zero;
   determining a difference between the theoretical set of discrete magnitudes and measured plurality of correlation samples;
   squaring the difference;
   summing the squared difference; and
   determining an optimum time-shift variable resulting from the comparison of the first set of measured points against the set of ideal points.

2. A method as in claim 1 wherein the set of ideal points further comprises a variable time shifted set of ideal points.

3. A method as in claim 2 wherein determining the optimum time shift variable further comprises:
   determining the optimum time shift variable that yields a minimum squared error between the first set of measured points and the set of ideal points.

4. A method as in claim 1 wherein the correlation function is $[(-|n+a|+8)/8]$.

5. A method as in claim 1 wherein measuring the plurality of correlation samples further comprises:
   measuring a plurality of discrete-time function correlation samples.

6. A method as in claim 1 wherein measuring the plurality of correlation samples further comprises:
   measuring a plurality of continuous-time function correlation samples.

7. A method as in claim 1 wherein measuring the plurality of correlation samples further comprises:
   measuring a plurality of correlation samples containing discontinuities.

8. A method as in claim 1 wherein measuring the plurality of correlation samples further comprises:
   measuring a plurality of correlation samples without discontinuities.

9. A method as in claim 1 wherein measuring the plurality of correlation samples further comprises:
   measuring a plurality of correlation samples containing a derivative at every point.

10. A method as in claim 1 wherein measuring the plurality of correlation samples further comprises:
    measuring a plurality of correlation samples without a derivative at every point.

11. A program storage device readable by a machine, tangibly embodying a program of instructions executable by the machine to perform method steps for timing correction for fast PN acquisition, the method comprising the steps of:
    measuring a first set of measured points, wherein the first set of measured points correspond to a first set of measured correlation samples;
    determining a set of ideal points;
    comparing the first set of measured points against the set of ideal points wherein comparing the first set of measured points against the set of ideal points further comprises:
    measuring a plurality of correlation samples;
    assigning a first discrete time to the plurality of measured correlation samples;
    assigning a time shift in units of measured correlation samples;
    determining a theoretical set of discrete magnitudes;
    determining a correlation function;

determining where the correlation function equals zero;
zeroing the theoretical set of discrete magnitudes where the correlation function equals zero;
determining a difference between the theoretical set of magnitudes and the measured plurality of correlation samples;
squaring the difference;
summing the squared difference; and
selecting an optimum time-shift variable resulting from the comparison of the first set of measured points against the set of ideal points.

12. A program storage device as in claim 11 wherein the program of instructions comprises at least one Very High Speed Integrated Circuit (VHSIC) Hardware Description (VHDL) Language file.

* * * * *